United States Patent [19]

Kanamaru

[11] Patent Number: 4,768,104

[45] Date of Patent: Aug. 30, 1988

[54] VIDEO DISK RECORDER AND PLAYBACK UNIT

[75] Inventor: Hitoshi Kanamaru, Saitama, Japan

[73] Assignee: Pioneer Electronic Corporation, Tokyo, Japan

[21] Appl. No.: 828,798

[22] Filed: Feb. 12, 1986

[30] Foreign Application Priority Data

Feb. 13, 1985 [JP] Japan ................................. 60-27250

[51] Int. Cl.[4] .............................................. H04N 5/781
[52] U.S. Cl. ...................................... 358/342; 358/343
[58] Field of Search ....................... 358/342, 343, 335; 360/19.1, 20

[56] References Cited

U.S. PATENT DOCUMENTS

| | | | |
|---|---|---|---|
| 4,286,290 | 8/1981 | Pyles et al. | 358/343 X |
| 4,680,647 | 7/1987 | Moriyama | 358/343 |
| 4,689,697 | 8/1987 | Wilkinson | 358/343 X |

Primary Examiner—W. B. Perkey
Attorney, Agent, or Firm—Sughrue, Mion, Zinn, Macpeak & Seas

[57] ABSTRACT

An optical video disk, an optical disk recorder, and a playback unit for an optical video disk in which a digital data signal is divided into blocks, each being formed of a fixed number of bits, and the length thereof after interleaving is made longer than one field of a television video signal but shorter than one frame thereof. As a result, at least one block is made to correspond to one frame or field of the video signal, and the end portion of the block after interleaving is recorded at a position close to a point corresponding to the vertical synchronizing signal of the video signal and at the same time recorded on a corresponding frame or field basis. Accordingly, digital data in the form of blocks may be made to correspond to specific frames or fields, whereby desired picture images or digital data can readily be retrieved and played back.

32 Claims, 13 Drawing Sheets

VIDEO DISK RECORDER AND PLAYBACK UNIT

BACKGROUND OF THE INVENTION

The present invention relates to a video disk recorder and playback unit.

Disks capable of recording data of high density have recently been developed and commercialized. Video disks and digital audio disks (compact disks) are typical examples.

The optical video disk has spectrum characteristics as shown in FIG. 1. Television video signals, whose synch pulse and white levels are at 7.6 MHz and 9.3 MHz, respectively, are recorded using frequency modulation, and two accompanying audio signals, such as left- and right-channel stereo signals or bilingual signals, having carriers at 2.3 MHz and 2.8 MHz, are also recorded using frequency modulation.

In the case of an optical digital audio disk, the spectrum of the EFM signals of the left and right stereo audio signals, which are in CPM form, occupies a frequency band lower than about 2 MHz, as shown in FIG. 2. As the above-described band of lower than 2 MHz is left substantially unoccupied on a video disk, such EFM signals can be recorded on the video disk in that band using a frequency-division multiplexing method. FIG. 3 illustrates the spectrum in that case. It can be seen from FIG. 3 that in this case all signals can be separated satisfactorily.

FIG. 4 is a block diagram of a video disk recorder which records signals in the above-discussed format. In the recorder, the high frequency component, pre-emphasized by a pre-emphasis circuit 1, of a television video signal is modulated by an FM modulator 2 and applied to one input of an adder 3. Audi signals in two channels are pre-emphasized in pre-emphasis circuits 4 and 5 and are frequency modulated by respective FM modulators 6 and 7 before being applied to the adder 3. Moreover, the audio signals in the two channels are converted into digital values (PCM) by a PCM encoder, subjected to EFM modulation by an EFM encoder 9, unwanted high frequency components are removed by a low-pass filter 10, and then the signals thus processed are applied to the adder 3 through a pre-emphasis circuit 11. Accordingly, FM signals including the video signal, the FM signals of the audio signals in the two channels, and the EFM signals of the audio signals in the two channels are summed together by the adder 3, whereby a multiplex signal is produced. The multiplex signal is passed through a limiter 12 before being supplied to an optical modulator 13. Consequently, a laser beam produced by a laser source 14 is modulated according to the multiplex signal and irradiated onto a recording master disk 17, rotated by a motor 16, through an objective lens 15, so that the multiplex signal is recorded. Disk copies can then be made from the master disk 17 in a well-known manner.

FIG. 5 is a block diagram of a playback unit for playing back a disk thus prepared. A laser beam emitted from a pickup 23 is irradiated onto a disk 22, driven by a motor 21, through an objective lens 24, and light reflected from the disk is received by the pickup 23 through the objective lens 24 to thus generate a playback signal. The playback signal is passed through an amplifier 25, and the video signal from the amplified signal is supplied to an FM democulator 27 through a bandpass filter 26 for demodulation before being outputted through a de-emphasis circuit 28. The two audio signals are respectively supplied to FM demodulators 31 and 32 through bandpass filters 29 and 30 for demodulation. The corresponding demodulated signals are applied through deemphasis circuits 33 and 34 to an output amplifier. The EFM signal components are separated from each other by a low-pass filter 35 then supplied to an EFM decoder 37 and a PCM decoder 38 through a de-emphasis circuit 36 for EFM and PCM demodulation, and regenerated as analog signals. As a result, the user is allowed to select higher-fidelity audio signals from the output of the PCM decoder 38 in place of the normal signals provided through the FM demodulator 31.

Digital data signals may be recorded in place of the EFM audio signals. However, since a digital data signal is different in many ways from an audio signal, for instance, a digital data signal need not always be continuous, it is generally advantageous to record the former in blocks. In that case, whether or not the player remains simple in construction is dependent upon the selection of the relationship between the blocks and the corresponding video signal in terms of position on the disk.

SUMMARY OF THE INVENTION

The invention is both a recorder and a playback unit for a video disk having recorded thereon in frequency-divisionmultiplex a video signal and a digital data signal. The digital data signal is divided into blocks of equal length and after interleaving the length of each of the blocks is longer than the length of field of the video signal. One or more of the digital data blocks are grouped together. According to the invention, one of the two ends of each group of blocks is aligned with the vertical synchronizing signal of the video signal.

DESCRIPTION OF THE PREFERRED EMBODIMENTS

Disk and Recorder

Figure 1:
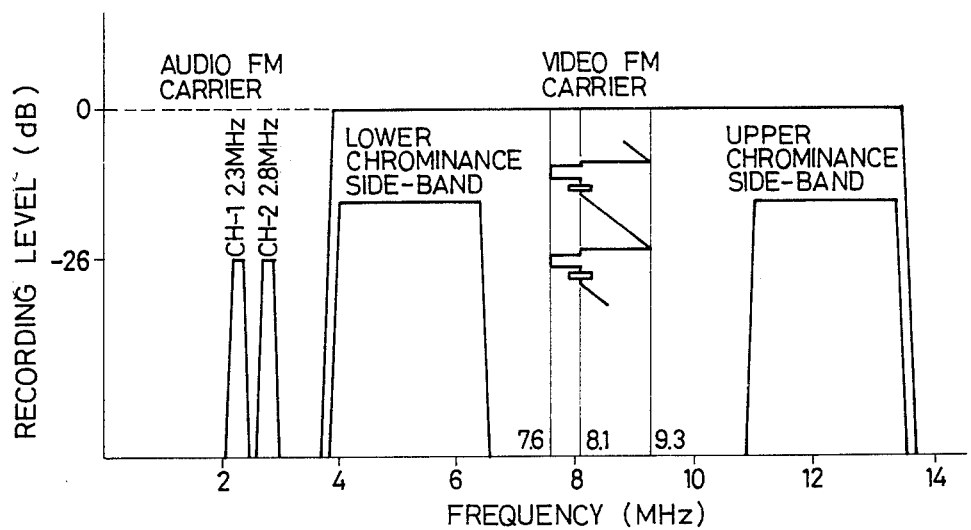
FIG. 1 shows a frequency spectrum of an optical video disk.
Figure 2:
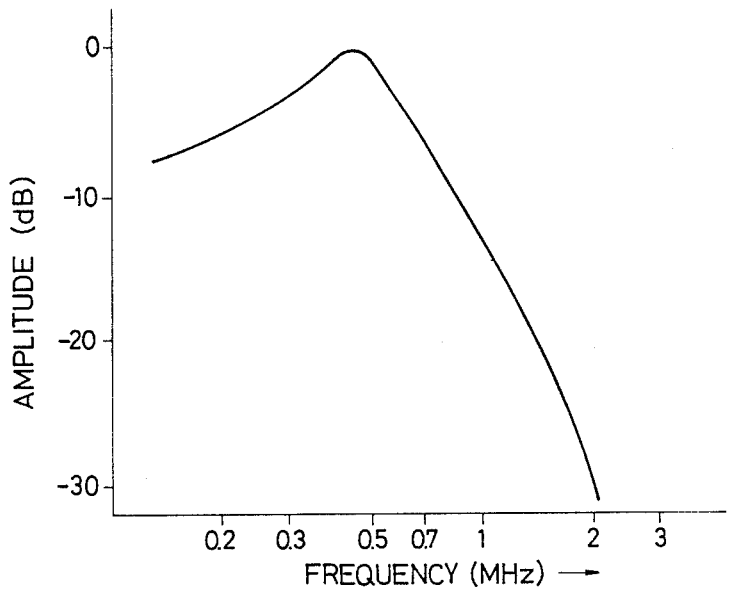
FIG. 2 shows a frequency spectrum of an EFM signal.
Figure 3:
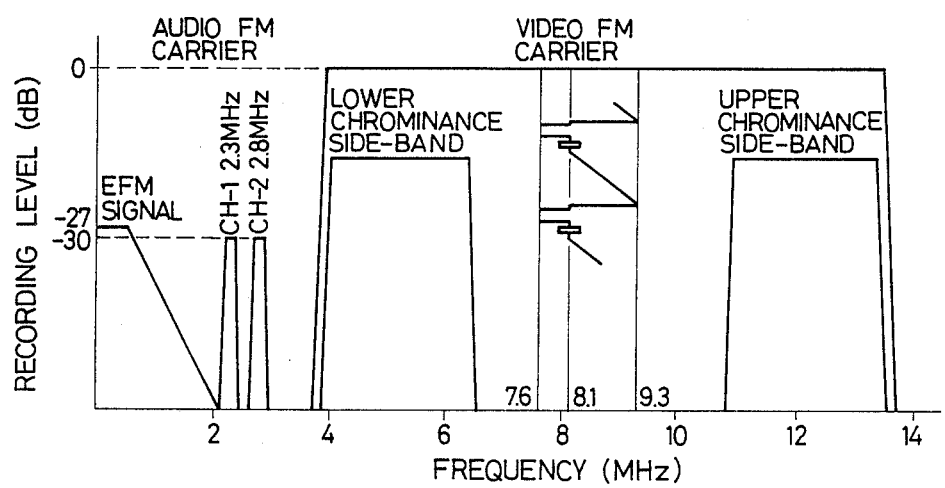
FIG. 3 shows a frequency spectrum of an optical video disk having stored thereon an EFM audio signal.
Figure 4:
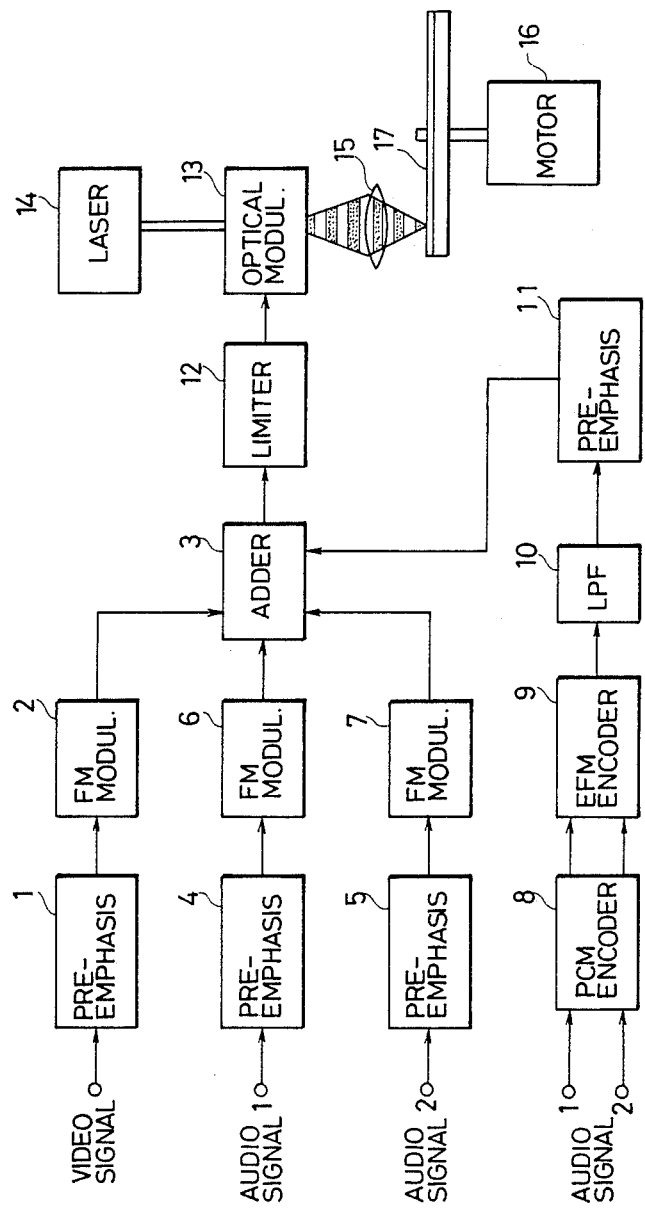
FIG. 4 is a block diagram of a conventional optical digital audio disk recorder.
Figure 6:
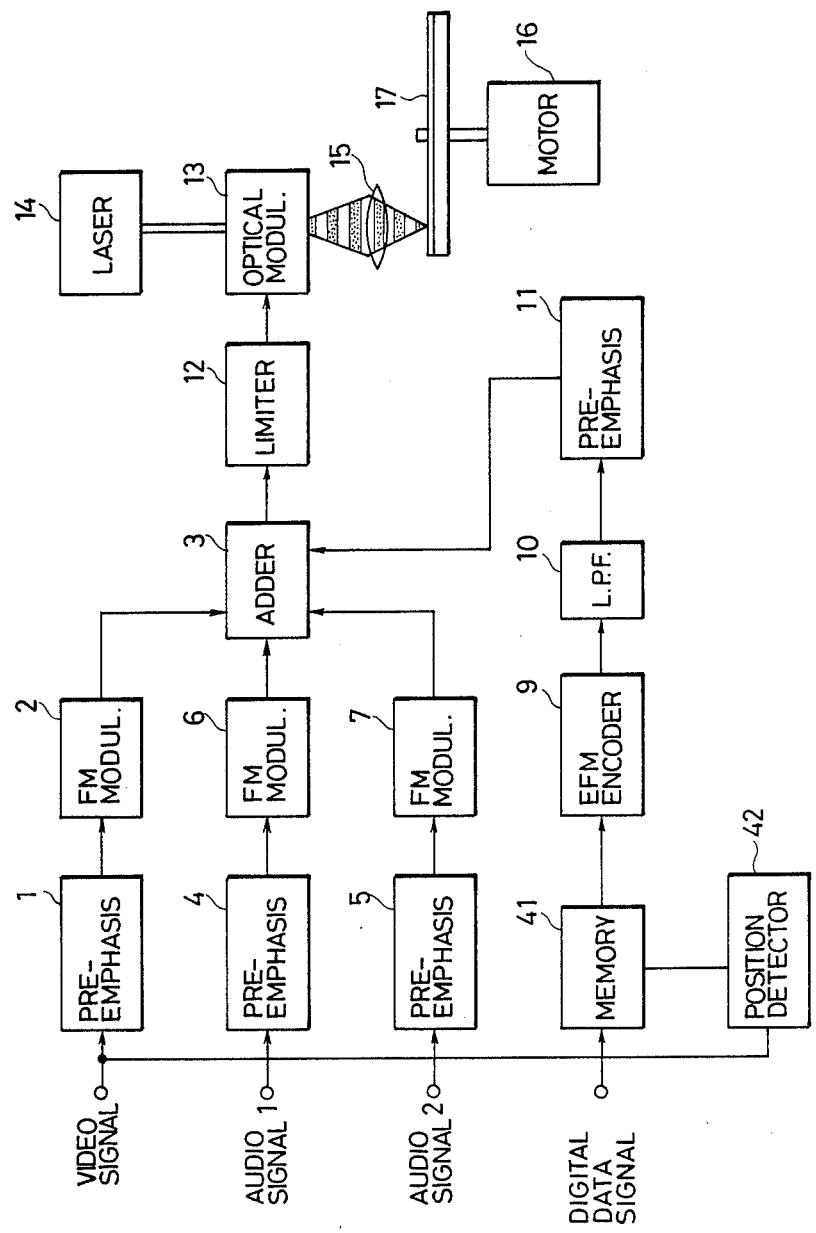
FIG. 6 is a block diagram of a disk recorder embodying the present invention.

FIG. 6 is a block diagram of a video disk recorder embodying the present invention, wherein like reference characters designate like or corresponding parts in FIG. 4, detailed descriptions of which will consequently be omitted.

In the case of FIG. 4, audio signals in two channels are applied to the EFM encoder 9 through the PCM encoder 8. However, according to the present invention, instead of audio signals in the case of FIG. 4, a digital data signal is applied to the EFM encoder 9 through a memory 41. (Needless to say, a changeover switch may be provided for allowing either an audio or digital signal to be selectively applied thereto). A position detector 42 detects the presence of a predetermined position in a video signal and controls the data flow from the memory 41 accordingly. As in the case of FIG. 4, there are provided a pre-emphasis circuit 1, an FM modulator 2 and an adder 3 for the video signal, pre-emphasis circuit 4 and 5, FM modulators 6 and 7 for the audio signals in the two channels, a low-pass filter 10 in the path of the digital signal from the EFM encoder 9, a pre-emphasis circuit 11, a limiter 12 arranged in the path of the signal from the adder 3, an optical modulator 13, a laser source 14, an objective lens 15, a motor, a recording master disk 17, etc.

The operation of the recorder will be described. The video signal and the two audio signals are subjected to pre-emphasis and frequency modulation in the pre-emphasis circuits 1, 4 and 5 and the FM modulators 2, 6 and 7, respectively, and then summed by the adder 3 in the same manner as described above.

Figure 10:
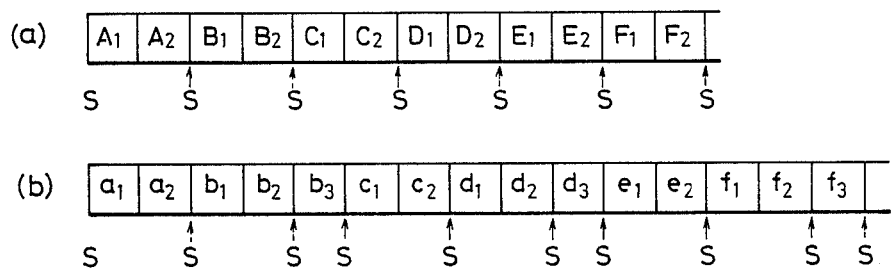
FIG. 10 is a top view of a typical field of a television video signal.

The position detector 42 is used to detect a predetermined position in the video signal. The detected position in the video signal may be any vertical synchronizing signal position; the vertical synchronizing signal position marked with "s" in FIG. 10 may be used, for instance. The arrow in FIG. 10 represents the position where the pickup in playing back a static picture is allowed to jump on a CAV (constant angular velocity) disk where a video signal is stored as one frame (two fields) per revolution. In the case of ordinary television video signals, one picture frame is formed with odd fields ($A_1$, $B_1$, $C_1$, $D_1$, $E_1$, $F_1$) and the following with even fields ($A_2$, $B_2$, $C_2$, $D_2$, $E_2$, $F_2$). Accordingly, a position close to that of the vertical synchronizing signal where an odd field changes to an even field is the position where a jump is possible (FIG. 10, part (a)). On the other hand, if a motion picture film having 24 frames per second is converted into a television video signal using the so-called 3-2 pulldown technique, there will be portions ($a_1$, $a_2$, $c_1$, $c_2$, $e_1$, $e_2$) with the same image recorded over two contiguous fields and others ($b_1$, $b_2$, $b_3$, $d_1$, $d_2$, $d_3$, $f_1$, $f_2$, $f_3$) with the same image recorded over three contiguous fields. Consequently, the position where the pickup is allowed to jump for static picture playback is where the same image is present in two fields simultaneously one field prior (FIG. 10, part (b)). Accordingly, the position detected by the position detector 42 is that of the synchronizing signal one frame (two fields) prior to that of the synchronizing signal where a jump (marked with the arrow) is possible. Although there exist two places where the same image has been recorded in three consecutive fields, only one of them is selected.

The memory 41 outputs the digital data stored therein a fixed period of time after the position detector 42 has detected the position s. This digital data is supplied to the EFM encoder 9 where interleaving is carried out, and the signal thus processed is applied to the adder 3 through the pre-emphasis circuit 11 before being added to the frequency-modulated video and audio signals. As a result, this digital data is inserted into the multiplex signal close to the position s of the video signal.

Although the length of one block of the digital data signal may be set at any desired practical value, such as one or two kilobytes, if, however, the length thereof after interleaving is set to conform with that of an optical digital audio disk, i.e., 2,352 kilobytes (=98 frames×24 bytes), or 18.816 kilobits, the length of one block is about 13.3 msec prior to interleaving, and after extension due to interleaving by the EFM encoder, about 14.7 msec. Therefore, the total length of one block after interleaving is about 16.7 msec. As the vertical synchronizing signal is generated at an interval (one field period) of roughly 16.7 ms, the time length of one block before interleaving is thus shorter than the interval (one field period) of the vertical synchronizing signal. However, the time duration after interleaving is longer than one field period but shorter than one frame period. If digital data signals $Da_1$, $Da_2$ or $Db_1$, $Db_2$ of two blocks are, for instance, distributed on a frame basis according to the video signals A and B (FIG. 9, part (a)) in each frame (FIG. 9, part (c)), the end portions of the last blocks $Da_2'$, $Db_2'$, $Dc_2'$ (after interleaving) are respectively recorded (FIG. 9, part (c)) at positions close to the last vertical synchronizing signals (FIG. 9, part (f)) in the frames.

Figure 9:
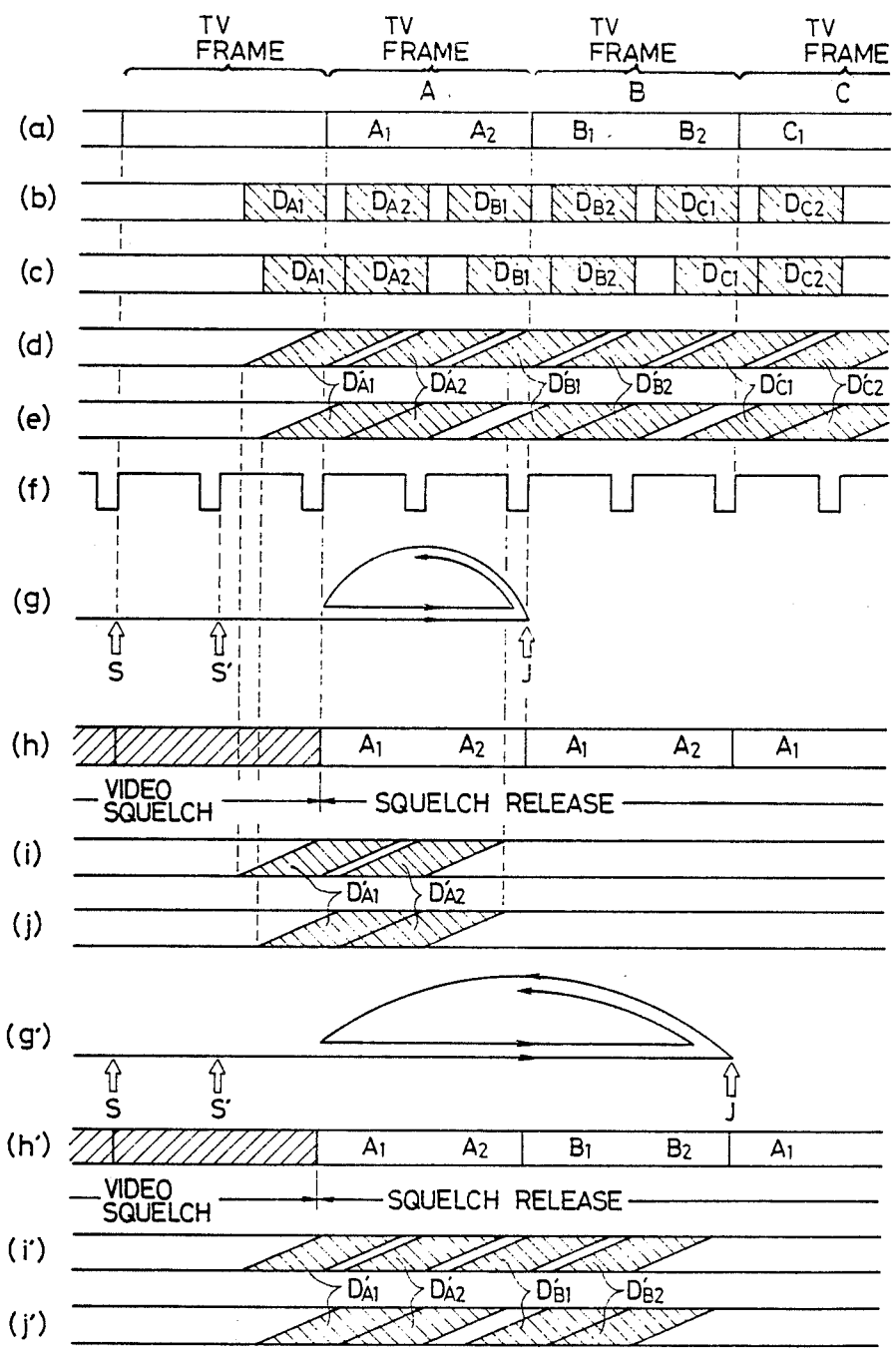
FIG. 9 is a timing chart showing signals during recording and playback.

Moreover, if the various blocks are each distributed on a field basis (FIG. 9, part (b)), the end portions of the blocks $Da_1'$, $Da_2'$, $Db_1'$, $Db_2'$, $Dc_1'$ ... (after interleaving) are respectively recorded (FIG. 9, part (d)) at positions close to times corresponding to the vertical synchronizing signals immediately after the fields. However, the digital data signal should not be recorded in the vertical blanking interval (inclusive of the vertical synchronizing signal period) because it is required to effect jumping in the vertical blanking interval.

The digital data blocks adjacent to each other are folded, and the front portions of the front blocks $Da_1'$, $Db_1'$ in the frames (after interleaving) correspond in position to the midpoints of the following fields in the preceding frames (not always corresponding thereto in contents) (FIG. 9, parts (d) and (e)).

Playback Unit

Figure 5:
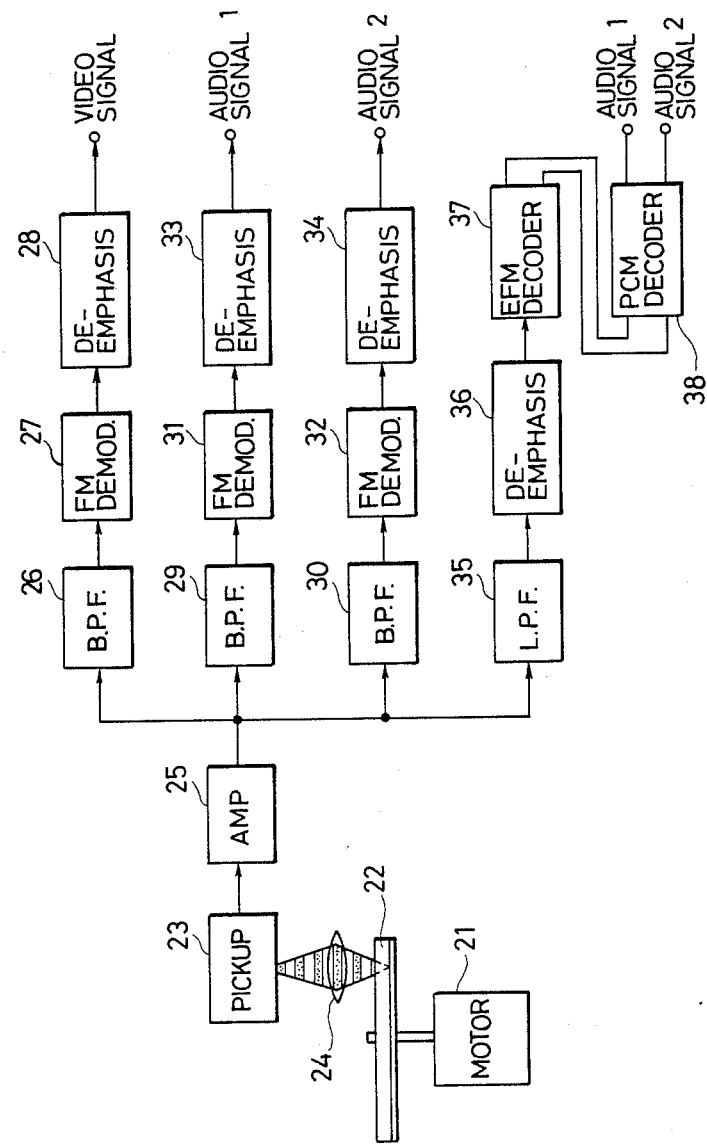
FIG. 5 is a block diagram of a playback unit.
Figure 7:
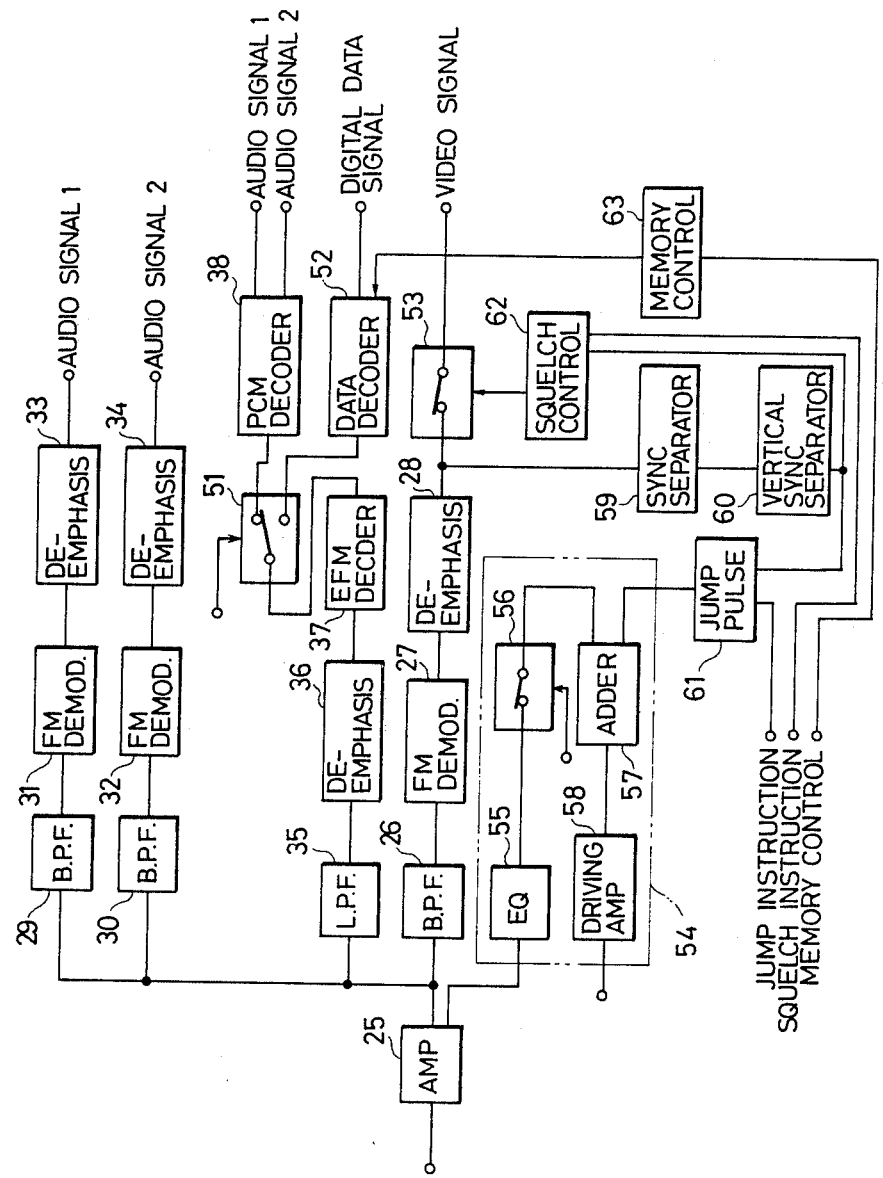
FIG. 7 is a block diagram of a playback unit for disks recorded with the apparatus of FIG. 6.

FIG. 7 is a block diagram of a playback unit of the invention, wherein like reference numerals characters designate like or corresponding parts in FIG. 5, and hence a further detailed description of which will be omitted.

In the playback unit according to the present invention, the output of an EFM decoder 37 is supplied to a decoder 52 or a PCM decoder 38 through a switch 51. The switch 51 turns on the PCM decoder 38 when an audio signal is recorded as the EFM signal and the decoder 52 when a digital data signal is recorded, the state of the switch 51 being set under instructions from a microprocessor (not shown). In the case of recording a digital data signal, the data decoder 52 can, needless to say, be omitted when the PCM decoder 38 is simultaneously utilized, and the switch 51 may be provided on the output side of the PCM decoder 38.

A switch 53 is used to squelch the video signal at the output of the de-emphasis circuit 28. A tracking control circuit 54 includes an equalizer 55 which receives the tracking error signal produced by an amplifier 25, a loop switch 56 for the tracking servo loop, an adder 57, and a driver amplifier 58 for driving a tracking actuator (not shown). The video signal generated by the de-emphasis circuit 28 is applied to a synchronizing signal separator circuit 59 and thence to a vertical synchronizing signal separator circuit 60 so that the vertical synchronizing signal is separated out and detected. The detected vertical synchronizing signal is supplied to a jump pulse generating circuit 61 and a squelch control circuit 62. A memory control circuit 63 is used to control the memory (RAM 75 in FIG. 8) of the data decoder 52. Jump and squelch instruction signals and a memory control signal are applied from the microprocessor to the jump pulse generating circuit 61, the squelch control circuit 62, and the memory control circuit 63.

When the recorded EFM signal is not a digital data signal but contains the two audio signals, the operation is the same as described with reference to the conventional playback unit, and therefore a further description thereof will be omitted and further reference will be made only to the case where the EFM signal is a digital data signal.

When frame A (digital data $Da_1'$, $Da_2'$) search instructions are issued by the microprocessor, the loop switch 56 opens, causing the frame A (digital data $Da_1'$, $Da_2'$) search operation to start, whereupon the squelch control circuit 62 opens the switch 53 and thus squelches the video signal. The loop switch 56 closes when the frame A (digital data $Da_1'$, $Da_2'$) is being played back, causing the tracking control device 54 to operate, whereby normal playback operations are resumed.

Of the playback signals from the amplifier 25, the EFM signal is applied to the EFM decoder 37 for EFM demodulation through the low-pass filter 35 and the de-emphasis circuit 36. The EFM-demodulated signal is applied to the data decoder 52 through the switch 51 and stored in the memory as specified by the signal from the memory control circuit 63. Jump instructions are applied to the jump pulse generator circuit 61 when the operation of storing the block $Da_2$ following the digital data is terminated (FIGS. 9, parts (i) and (j)). The jump pulse generating circuit 61 subsequently applies a jump pulse to the adder 57 in accordance with the detection of the vertical synchronizing signal from the vertical synchronizing separator circuit 60. (It is, needless to say, unnecessary to make the circuit 61 wait for the detection of the vertical synchronizing signal, provided that the jump pulse is generated immediately after the block $Da_2$ is read out). Consequently, the tracking actuator is driven to cause the pickup 23 to make a one-track (one-frame) jump from a location close to the vertical synchronizing signal between the second field $A_2$ of the frame A and the first field $B_1$ of the subsequent frame B to a point close to the vertical synchronizing signal immediately before the first field $A_1$ in the frame A. This one-track jumping operation is repeated after the frame A has been played back once to thereby play back the frame A as a static picture (FIG. 9, part (g)).

The squelch control circuit 62 closes the switch 53 and releases the squelch of the video signal when the pickup arrives at a position close to the vertical synchronizing signal immediately before the start of the frame A. Consequently, the user observes only a static image of the frame A (FIG. 9, part (h)). When the processing of the digital data signal is terminated, the static picture playback operation is released and the next operation is conducted.

Figure 8:
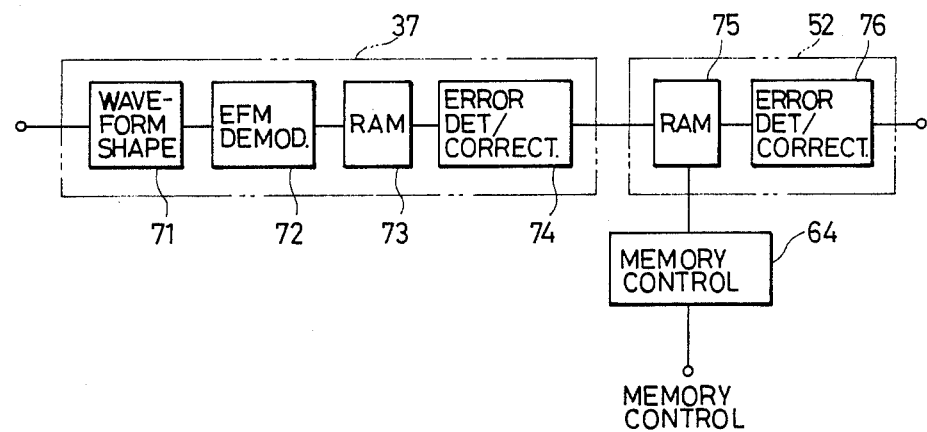
FIG. 8 is a detailed block diagram of a portion of the playback unit of FIG. 7.

FIG. 8 is a detailed block diagram illustrating the EFM decoder 37 and the data decoder 52 (the switch 51 being omitted). In the EFM decoder 37, the received EFM signal is subjected to waveform shaping in a waveform shaping circuit 71 and then demodulated by an EFM demodulator 72. After being temporarily stored in a 16-kilobit RAM 73 for de-interleaving processing, the resulting signal is applied to an error detection/correction circuit 74 for detecting and correcting errors. In the data decoder 52, the digital data is temporarily stored in a RAM 75, and, after being read out in response to a control signal from the memory control circuit 63, error detection and correction are performed thereon by the error detection/correction circuit 76.

Assuming a capacity of the RAM 75 of 38 kilobits (equivalent to two blocks, for instance), it is possible to process at one time digital data equivalent to that of one image. However, a RAM size of about 19 kilobits, which is equivalent to one block, may be used as well. In case the length of a series of data recorded on the disk exceeds the capacity of the RAM, the playback operation from a position close to the vertical synchronizing signal immediately before the first block $Da_1'$ up to a point close to the vertical synchronizing signal immediately after the following block $Da_2'$ and a jump-back operation from a position close to the vertical synchronizing signal immediately following the subsequent block $D'a_2'$ up to a point close to the vertical synchronizing signal immediately before the first block $Da_1'$ are repeated so that, after the digital data stored once is completely processed, the subsequent blocks may successively be stored and processed. In such a time period, a field or frame for video output squelching can be selected. If the same image is recorded in frames A and B, for instance, the field or frame can be played back as a static picture during the repeated jump operation. Moreover, the initial and last points between which the playback and jump-back operations are repeated can be respectively set, as shown in FIG. 9, part (g'), at a position close to the vertical synchronizing signal immediately before the frame A and a position close to the vertical synchronizing signal immediately after the frame B to allow two-track jump-back. In that case, the frames A and B are repeatedly played back after the blocks $Da_1$ to $Db_2$ are read out. In any case, the search target may be s or s'.

When the length of the digital data is one block, the squelch of the video signal can be released at the point of time the position s is reached, and the squelch time can be shortened by taking the length of one block as a minimum unit after interleaving (shorter than one frame) and setting the end point not at every vertical synchronizing signal position, but a position close to s in the vertical synchronizing signal at the above-described jump position. Moreover, the jump position thus determined is advantageous in ensuring compatibility with ordinary video disks presently on the market.

As set forth above, a digital data signal is divided into blocks, each being formed of a fixed number of bits, and the length thereof after interleaving is made longer than one field of a television video signal but shorter than one frame thereof. As a result, at least one block is made to correspond to one frame or field of the video signal, and the end portion of the block after interleaving is recorded at a position close to a point corresponding to the vertical synchronizing signal of the video signal and at the same time recorded on a corresponding frame or field basis. Accordingly, digital data in the form of blocks may be made to correspond to specific frames or fields, whereby desired picture images or digital data can readily be retrieved and played back.

Alternate embodiments of the invention will now be discussed with reference to the timing charts of FIGS. 11 to 15.

Figure 11:
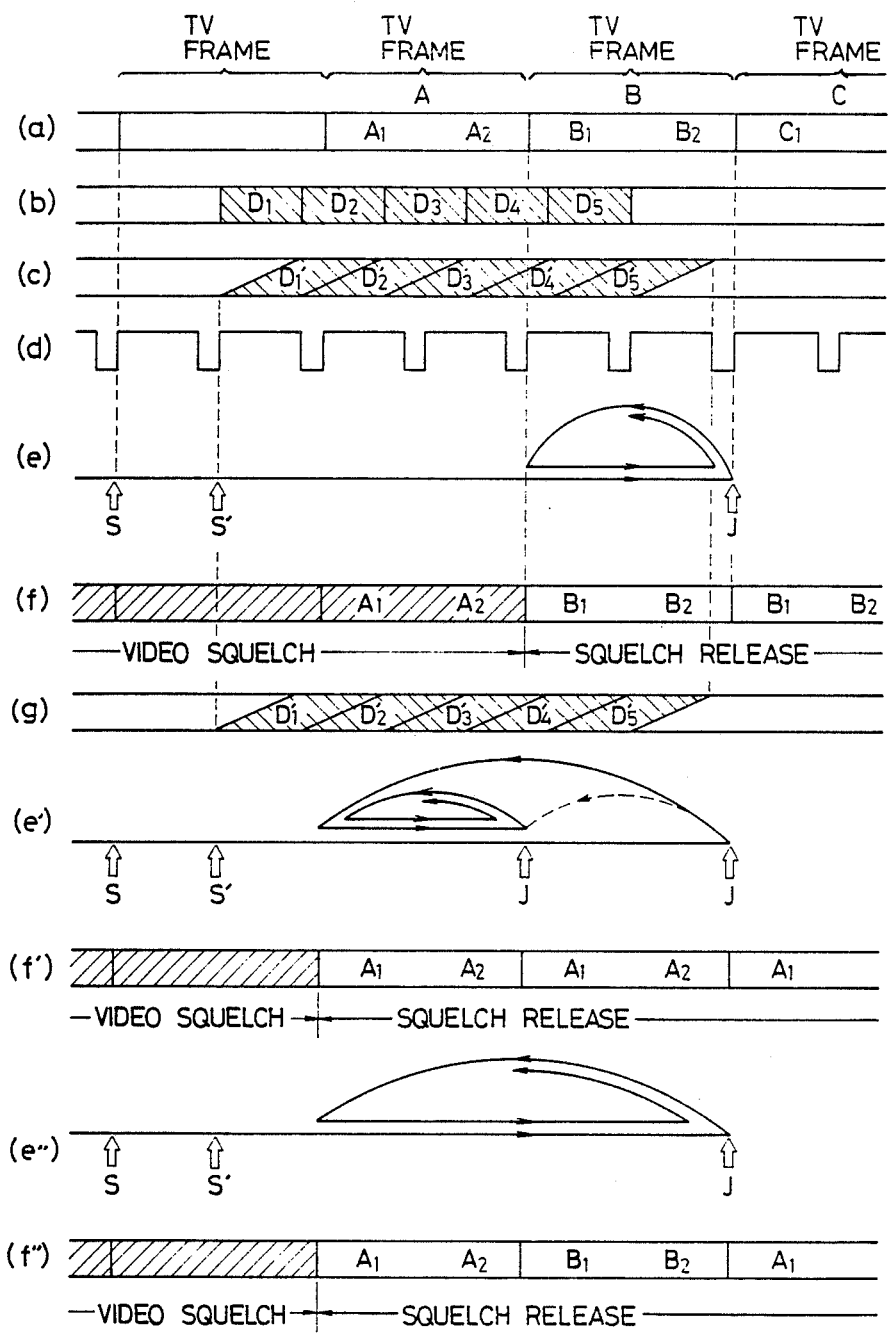
FIGS. 11 to 15 are timing charts similar to FIG. 9 but showing signals during recording and playback in accordance with corresponding alternate embodiments of the invention.

In the embodiment of FIG. 11, five blocks of digital data of the type discussed above are combined. The end of the block $D_5'$ is recorded at a position near the vertical synchronizing pulse appearing immediately after the second field $B_2$ of the frame B. As shown specifically by part (e), the pickup 23 jumps back from a position near the vertical synchronizing pulse between the second field $B_2$ of the frame B and the first field $C_1$ of the subsequent frame C to a position near the vertical synchronizing pulse between the second field $A_2$ of the frame A and the first field $B_1$ of the subsequent frame B. After reproduction of the frame B has been completed, this operation is repeatedly carried out.

Figure 12:
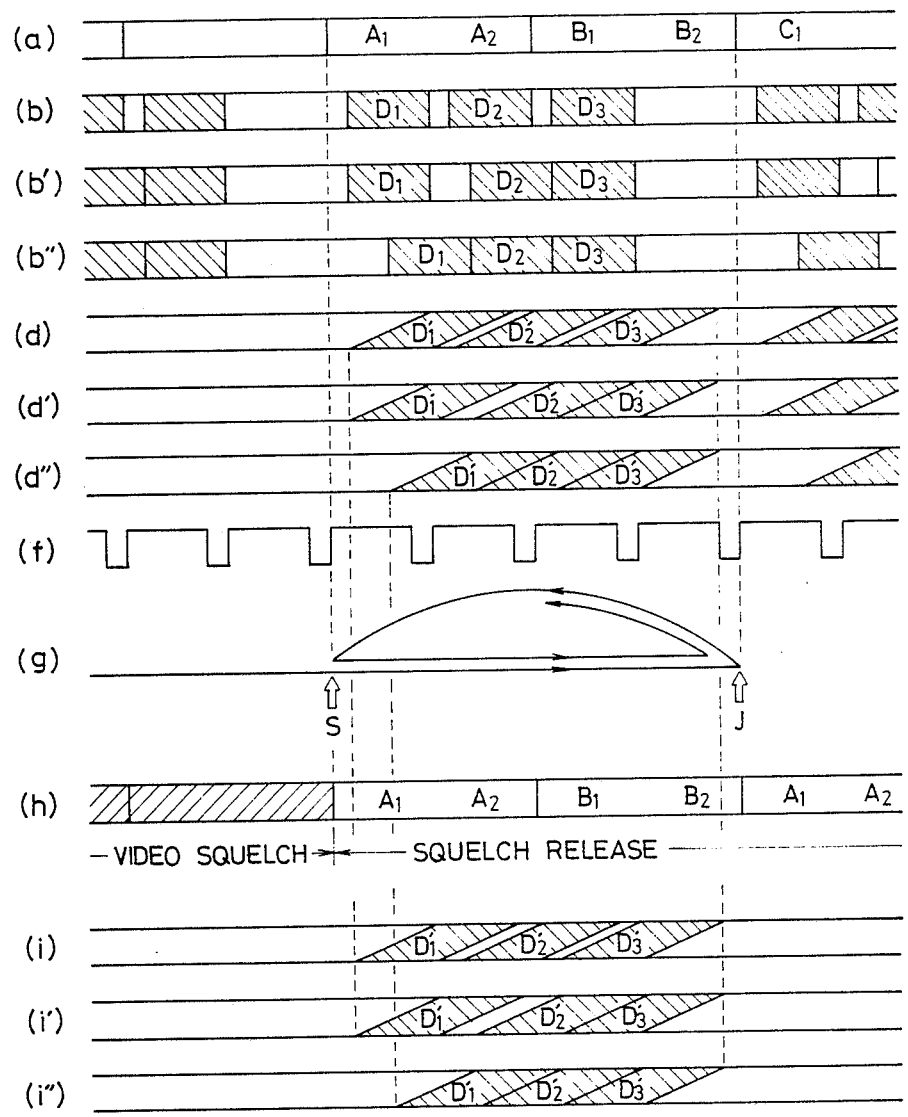

In the embodiment described by FIG. 12, similar to the embodiment of FIG. 11, the end of the interleaved digital data block $D_3'$ (Parts d, d', d'') is recorded near the vertical synchronizing pulse of the corresponding frame of the video signal. However, unlike the embodiment of FIG. 12, the head of the digital data is recorded after the vertical synchronizing pulse appearing after the beginning of the corresponding video signal interval, or it may be recorded after the corresponding vertical synchronizing pulse N revolutions prior thereto on the disk (N being an integer).

Figure 13:
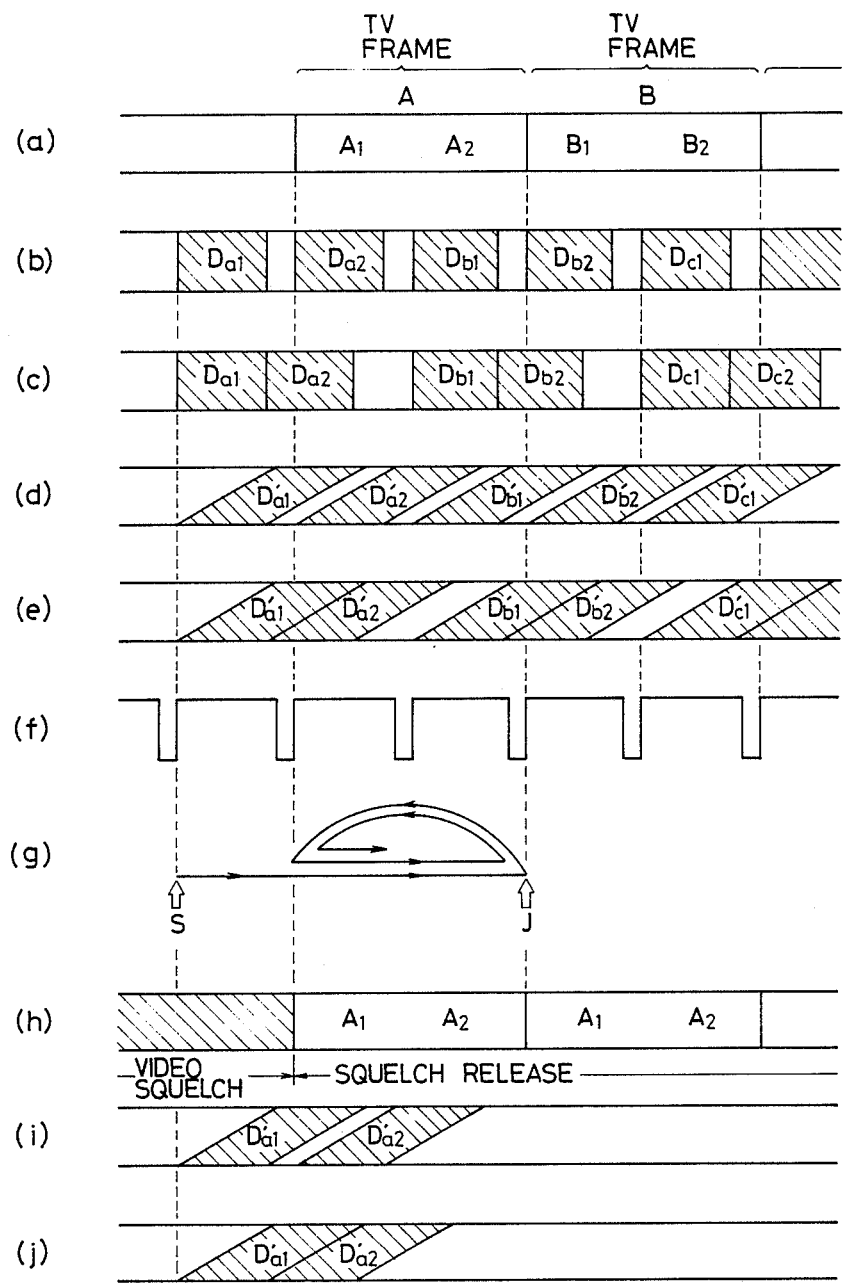

As indicated in parts (b) and (d), in the embodiment of FIG. 13, the blocks of digital data are recorded separately from one another. With reference to parts (c) and (e) of FIG. 13, two blocks of the digital data ($D_{a1}$, $D_{a2}$), corresponding to one television video frame, are recorded contiguously. The head of each digital data block is recorded near the vertical synchronizing pulse of the preceding field.

Figure 14:
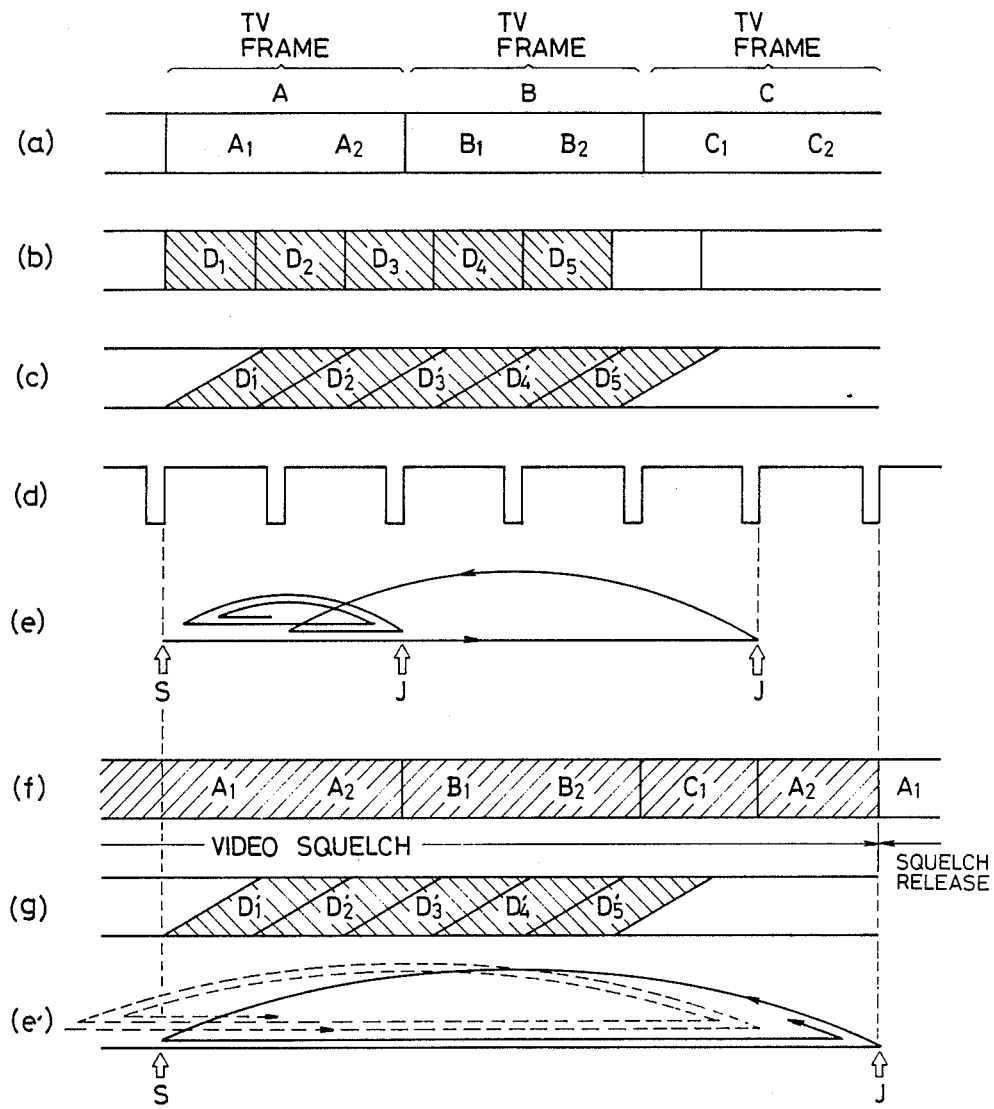
Figure 15:
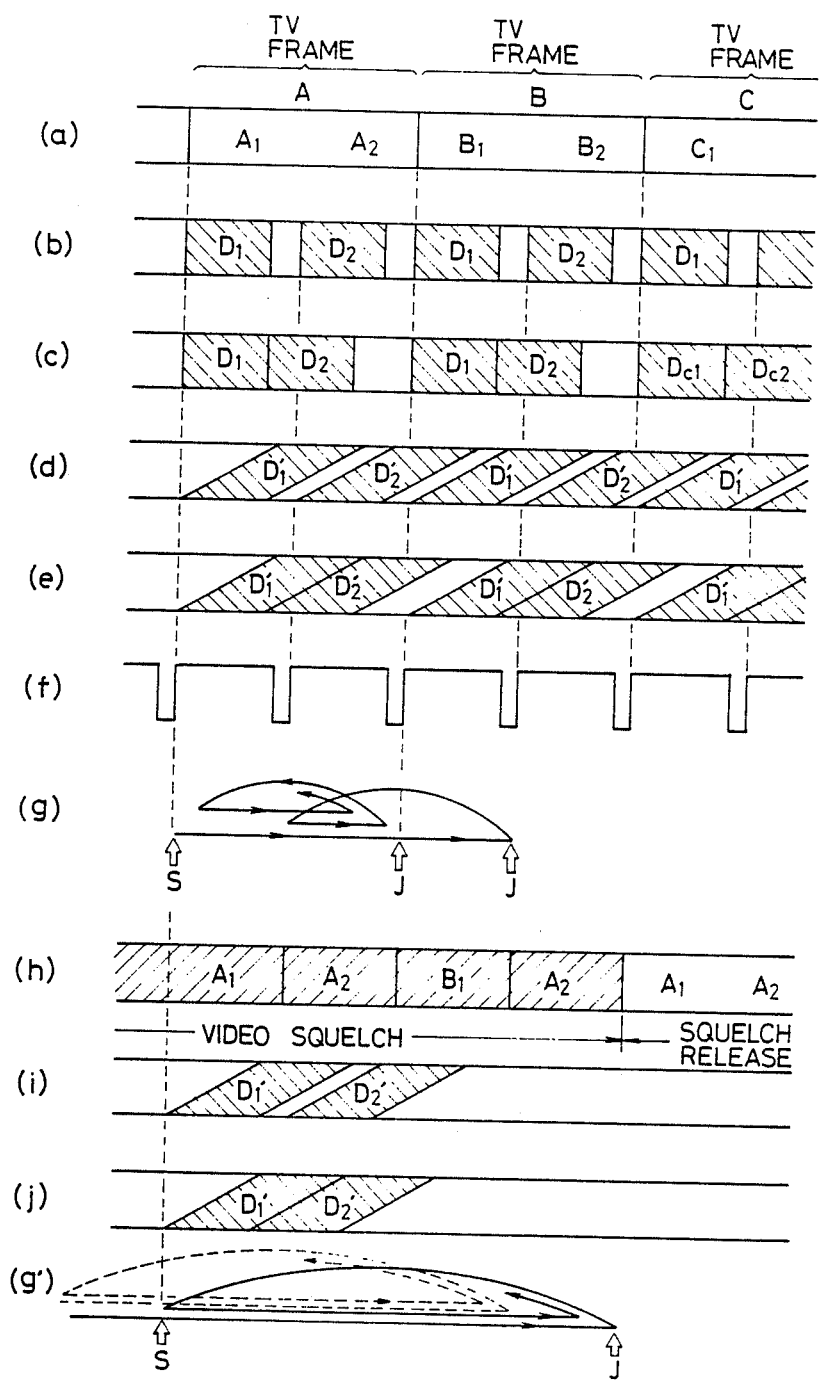

In FIGS. 14 and 15, the head of each digital data block is recorded immediately after the vertical synchronizing pulse of the corresponding television video frame. In FIG. 14, similar to the case illustrated in FIG. 11, the head of the interleaved digital data block is recorded immediately after the first vertical synchronizing pulse of the corresponding video frame. Five blocks are recorded contiguously. Also, similar to the case of FIG. 12, the head of the combined digital blocks is recorded at a position so as to coincide with the vertical synchronizing signal preceding by N revolutions the position where jumping can be effected.

Finally, in the embodiment illustrated in FIG. 15, the digital data blocks are recorded in a nonsequential manner on a field-by-field basis (parts (b) and (d)), or on a frame-by-frame basis (parts (d) and (e)).

It should be noted that the invention is equally applicable to both NTSC and PAL television systems.

This completes the description of the preferred embodiments of the invention. Although preferred embodiments have been described, it is believed that numerous modifications and alterations thereto may be made without departing from the spirit and scope of the invention.

What is claimed is:

1. In a video disk recorder for a video disk having recorded thereon a frequency-division-multiplexed combination of a television video signal and a digital data signal on the same track, an improvement comprising: means for dividing said digital data signal into blocks, each said block having a predetermined fixed number of bits and a length after interleaving longer than one field of said video signal but shorter than one frame of said video signal, at least one of said blocks corresponding to one frame or field of said video signal; means for detecting a last vertical synchronizing signal in said frame or field corresponding to said at least one block; means for producing a digital block signal from said blocks in such a manner than an end portion of said at least one block after interleaving is at a position close to a position corresponding to the detected last vertical synchronizing signal and positioned on the basis of said frame or field corresponding to said at least one block; means for adding said video signal and said digital block signal; and means for recording the resulting sum of said video signal and said digital block signal on said video disk.

2. In a video disk recorder for a video disk having recorded thereon a frequency-division-multiplexed combination of a television video signal and a digital data signal on the same track, an improvement comprising: means for dividing said digital data signal into blocks, each block having a predetermined fixed number of bits and a length after interleaving longer than one field of said video signal but shorter than one frame of said video signal, at least one block corresponding to one frame or field of said video signal; means for detecting a vertical synchronizing signal appearing after a second field in a predetermined frame of said video signal; means for producing a digital block signal from said blocks in such a manner that a predetermined plural number of said blocks are positioned immediately after the detected vertical synchronizing signal; means for adding said video signal and said digital block signal; and means for recording the resulting sum of said video signal and said digital block signal on said video disk.

3. The video disk recorder of claim 2, wherein said predetermined number of said blocks is five.

4. In a video disk recorder for a video disk having recorded thereon a frequency-division-multiplexed combination of a television video signal and a digital data signal on the same track, an improvement comprising: means for dividing said digital data signal into blocks, each block having a predetermined fixed number of bits and a length after interleaving longer than one field of said video signal but shorter than one frame of said video signal, at least one of said blocks corresponding to one frame or field of said video signal; means for detecting a vertical synchronizing signal of said video signal; means for producing a digital block signal from said blocks in such a manner that a plurality of said blocks are arranged nonconsecutively in a sequence, wherein a front edge of a head one of said arranged blocks is recorded at a position immediately following a detected vertical synchronizing signal appearing after the beginning of the corresponding video signal; means for adding said video signal and said digital block signal; and means for recording the resulting sum of said video signal and said digital block signal on said video disk.

5. The video disk recorder of claim 4, wherein said sequence contains three of said blocks of digital data.

6. In a video disk recorder for a video disk having recorded thereon a frequency-division-multiplexed combination of a television video signal and a digital data signal on the same track, an improvement comprising: means for dividing said digital data signal into blocks, each block having a predetermined fixed number of bits and a length after interleaving longer than one field of said video signal but shorter than one frame of said video signal, at least one of said blocks corresponding to one frame or field of said video signal; means for detecting a vertical synchronizing signal of said video signal; means for producing a digital block signal from said blocks in such a manner that a plurality of said blocks are arranged nonconsecutively in a sequence, wherein a front edge of a head one of said arranged blocks is recorded at a position immediately following a detected vertical synchronizing signal appearing N revolutions preceding the beginning of the corresponding video signal; means for adding said video signal and said digital block signal; and means for recording the resulting sum of said video signal and said digital block signal on said video disk.

7. The video disk recorder of claim 6, wherein said sequence contains three of said blocks of digital data.

8. In a video disk recorder for a video disk having recorded thereon a frequency-division-multiplexed combination of a television video signal and a digital data signal on the same track, an improvement comprising: means for dividing said digital data signal into blocks, each block having a predetermined fixed number of bits and a length after interleaving longer than one field of said video signal but shorter than one frame of said video signal, at least one of said blocks corresponding to one frame or field of said video signal; means for detecting a vertical synchronizing signal of said video signal; means for producing a digital block signal from said blocks containing sequences of a plurality of blocks, a head of each sequence occurring near a detected vertical synchronizing signal of a preceding field of said video signal; means for adding said video signal and the modulated digital block signal; and means for recording the resulting sum of said video signal and said digital block signal on said video disk.

9. The video disk recorder of claim 8, wherein said blocks are arranged consecutively in each said sequence.

10. The video disk recorder of claim 8, wherein said blocks are arranged nonconsecutively in each said sequence.

11. In a video disk recorder for a video disk having recorded thereon a frequency-division-multiplexed combination of a television video signal and a digital data signal on the same track, an improvement comprising: means for dividing said digital data signal into blocks, each block having a predetermined fixed number of bits and a length after interleaving longer than one field of said video signal but shorter than one frame of said video signal, at least one of said blocks corresponding to one frame or field of said video signal; means for detecting a first vertical synchronizing signal of each frame of said video signal; means for producing a digital block signal from said blocks containing sequences of a plurality of blocks, a head of each sequence occurring near a detected vertical synchronizing signal of a corresponding field of said video signal; means for adding said video signal and a modulated digital block signal; and means for recording the resulting sum of said video signal and said digital block signal on said video disk.

12. The video disk recorder of claim 11, wherein said blocks are arranged consecutively in each said sequence.

13. The video disk recorder of claim 11, wherein said blocks are arranged nonconsecutively in each said sequence.

14. In a video disk recorder for a video disk having recorded thereon a frequency-division-multiplexed combination of a television video signal and a digital data signal on the same track, an improvement comprising: means for dividing said digital data signal into blocks, each block having a predetermined fixed number of bits and a length after interleaving longer than one field of said video signal but shorter than one frame of said video signal, at least one of said blocks corresponding to one frame or field of said video signal; means for detecting a first vertical synchronizing signal of each frame of said video signal; means for producing a digital block signal from said blocks containing sequences of a plurality of blocks, a head of each sequence coinciding in position with a detected vertical synchronizing signal preceding a jumping position on said disk by N revolutions, where N is an integer; means for adding said video signal and the modulated digital block signal; and means for recording the resulting sum of said video signal and said digital block signal on said video disk.

15. The video disk recorder of claim 14, wherein said blocks are arranged consecutively in each said sequence.

16. The video disk recorder of claim 14, wherein said blocks are arranged nonconsecutively in each said sequence.

17. A video disk playback unit for playing back a video disk having stored thereon a frequency-division-multiplexed combination of a television video signal and a digital data signal on the same track, said digital data signal being divided into blocks of a predetermined fixed number of bits, a length thereof after interleaving being longer than one field of said video signal, at least one of said blocks corresponding to one frame or field of said video signal, an end portion of said at least one block after interleving being recorded at a position close to a position corresponding to a vertical synchronizing signal in the corresponding frame or field, comprising: means for reproducing said multiplex signal from said disk; filter means for separating modulated signals of said video signal and said digital data signal from the reproduced multiplex signal; and means for repeatedly detecting said vertical synchronizing signal at a position close to a position corresponding to an end portion of said at least one block of said digital signal and at a predetermined position at a rear part of said end portion of said at least one block, whereby the video signal in said frame or field corresponding to said block is played back.

18. A video disk playback unit for a video disk having recorded thereon a frequency-division-multilexed television video signal and a digital data signal on the same track, said digital data signal being divided into blocks, each block having a predetermined fixed number of bits and a length after interleaving longer than one field of said video signal but shorter than one frame of said video signal, at least one of said blocks corresponding to one frame or field of said video signal, comprising: means for reproducing said multiplex signal from said disk; filter means for separating modulated signals of said video signal and said digital data signal from the reproduced multiplex signal; means for detecting a vertical synchronizing signal appearing after a second field in a predetermined frame of said video signal; and means for reproducing from the detected digital data signal a predetermined plural number of said blocks positioned immediately after the detected vertical synchronizing signal.

19. The video disk playback unit of claim 18, wherein said predetermined number of sid blocks is five.

20. A video disk playbackunit for a video disk having recorded thereon a frequency-division-multiplexed combination of a television video signal and a digital data signal on the same track, said digital data signal being divided into blocks, each block having a predetermined fixed number of bits and a length after interleaving longer than one field of said video signal but shorter than one frame of said video signal, at least one of said blocks corresponding to one frame or field of said video signal, comprising: means for reproducing said multiplex signal from said disk; filter means for separating modulated signals of said video signal and said digital data signal from the reproduced multiplex signal; means for detecting a vertical synchronizing signal of said video signal; and means for reproducing from the detected digital data signal a plurality of said blocks arranged nonconsecutively in a sequence, wherein a front edge of a head one of said arranged blocks follows a position immediately following a detected vertical synchronizing signal appearing after the beginning of the corresponding video signal.

21. The video disk playback unit of claim 20, wherein said sequence contains three of said blocks of digital data.

22. A video disk playback unit for a video disk having recorded thereon a frequency-division-multiplexed combination of a television video signal and a digital data signal on the same track, said digital data signal being divided into blocks, each block having a predetermined fixed number of bits and a length after interleaving longer than one field of said video signal but shorter than one frame of said video signal, at least one of said blocks corresponding to one frame or field of said video signal, comprising: means for reproducing said multiplex signal from said disk; filter means for separating modulated signals of said video signal and said digital data signal from the reproduced multiplex signal; means for detecting a vertical synchronizing signal of said video signal; and means for reproducing from the detected digital data signal a plurality of said blocks arranged nonconsecutively in a sequence, wherein a front edge of a head one of said arranged blocks is at a position immediately following a detected vertical synchronizing signal appearing N revolutions preceding the beginning of the corresponding video signal.

23. The video disk playback unit of claim 6, wherein said sequence contains three of said blocks of digital data.

24. A video disk playbackunit for a video disk having recorded thereon a frequency-division-multiplexed combination of a television video signal and a digital data signal on the same track, said digital data signal being divided into blocks, each block having a predetermined fixed number of bits and a length after interleaving longer than one field of said video signal but shorter than one frame of said video signal, at least one of said blocks corresponding to one frame or field of said video signal, comprising: means for reproducing said multiplex signal from said disk; filter means for separating modulated signals of said video signal and said digital data signal from the reproduced multiplex signal; means for detecting a vertical synchronizing signal of said video signal; and means for reproducing from the detected digital data signal sequences of a plurality of said blocks, a head of each sequence occuring near a dtected vertical synchronizing signal of a preceding field of said video signal.

25. The video disk playback unit of claim 24, wherein said blocks are arranged consecutively in each said sequence.

26. The video disk playback unit of claim 24, wherein said blocks are arranged nonconsecutively in each said sequence.

27. A video disk playback unit for a video disk having recorded thereon a frequency-division-multiplexed combination of a television video signal and a digital data signal on the same track, said digital data signal being divided into blocks, each block having a predetermined fixed number of bits and a length after interleaving longer than one field of said video signal but shorter than one frame of said video signal, at least one of said blocks corresponding to one frame or field of said video signal, comprising: means for reproducing said multiplex signal from said disk; filter means for separating modulated signals of said video signal and said digital data signal from the reproduced multiplex signal; means for detecting a first vertical synchronizing signal of each frame of said video signal; and means for reproducing from the detected digital data signal sequences of a plurality of blocks, a head of each sequence occurring near a detected vertical synchronizing signal of a corresponding field of said video signal.

28. The video disk playback unit of claim 27, wherein said blocks are arranged consecutively in each said sequence.

29. The video disk playback unit of claim 27, wherein said blocks are arranged nonconsecutively in each said sequence.

30. A video disk playback unit for a video disk having recorded thereon a frequency-division-multiplexed combination of a television video signal and a digital data signal on the same track, said digital data signal being divided into blocks, each block having a predetermined fixed number of bits and a length after interleaving longer than one field of said video signal but shorter than one frame of said video signal, at least one of said blocks corresponding to one frame or field of said video signal, comprising: means for reproducing said multiplex signal from said disk; filter means for separating modulated signals of said video signal and said digital data signal from the reproduced multiplex signal; means for detecting a first vertical synchronizing signal of each frame of said video signal; and means for reproducing from the detected digital data signal sequences of a plurality of said blocks, a head of each sequence coinciding in position with a detected vertical synchronizing signal preceding a jumping position on said disk by N revolutions, where N is an integer.

31. The video disk playback unit of claim 30, wherein said blocks are arranged consecutively in each said sequence.

32. The video disk playback unit of claim 30, wherein said blocks are arranged nonconsecutively in each said sequence.

* * * * *